United States Patent
Fryer

(10) Patent No.: US 10,739,152 B2
(45) Date of Patent: Aug. 11, 2020

(54) DYNAMIC REPORTING OF LOCATION DATA FOR A VEHICLE BASED ON A FITTED HISTORY MODEL

(71) Applicant: VERIZON PATENT AND LICENSING INC., Basking Ridge, NJ (US)

(72) Inventor: Mark A. Fryer, Christchurch (NZ)

(73) Assignee: Verizon Patent and Licensing, Inc., Basking Ridge, NJ (US)

(*) Notice: Subject to any disclaimer, the term of this patent is extended or adjusted under 35 U.S.C. 154(b) by 84 days.

(21) Appl. No.: 15/941,872

(22) Filed: Mar. 30, 2018

(65) Prior Publication Data
US 2019/0301876 A1 Oct. 3, 2019

(51) Int. Cl.
*G01C 21/34* (2006.01)
*G01C 21/30* (2006.01)
*G08G 1/00* (2006.01)

(52) U.S. Cl.
CPC ........ *G01C 21/3446* (2013.01); *G01C 21/30* (2013.01); *G01C 21/3484* (2013.01); *G08G 1/20* (2013.01)

(58) Field of Classification Search
None
See application file for complete search history.

(56) References Cited

U.S. PATENT DOCUMENTS

| 2014/0278044 A1* | 9/2014 | Jacobs | H04W 4/40 701/300 |
| 2014/0278055 A1* | 9/2014 | Wang | G01C 21/32 701/409 |
| 2015/0354973 A1* | 12/2015 | Wang | G01C 21/30 701/410 |
| 2016/0247330 A1* | 8/2016 | Rork | H04W 4/021 |

\* cited by examiner

*Primary Examiner* — Navid Ziaeianmehdizadeh
*Assistant Examiner* — Sean P Quinn

(57) ABSTRACT

A device receives historical map data, and receives, during a time period, location data associated with a location of a vehicle. The device processes the location data, with a fitted history model, to generate a vehicle path, and processes a portion of the location data, with the fitted history model, to generate a fitted history path, based on the historical map data. The device compares the vehicle path and the fitted history path, and determines whether the vehicle path and the fitted history path match based on comparing the vehicle path and the fitted history path. The device provides the portion of the location data when the vehicle path and the fitted history path match, or adds location data to the portion of the location data and provides the portion of the location data and the added location data, when the vehicle path and the fitted history path do not match.

20 Claims, 12 Drawing Sheets

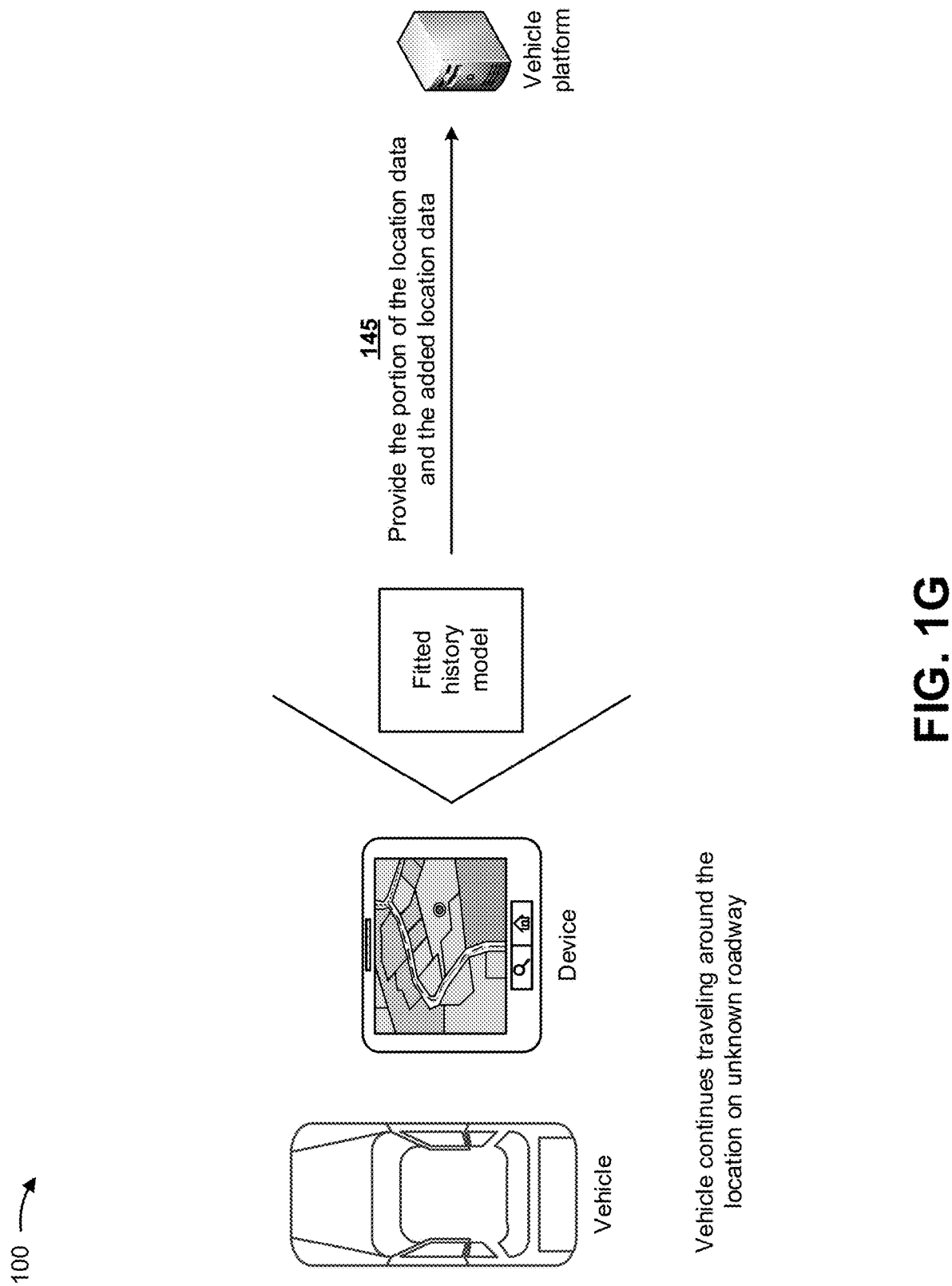

DYNAMIC REPORTING OF LOCATION DATA FOR A VEHICLE BASED ON A FITTED HISTORY MODEL

BACKGROUND

Automatic vehicle location is a mechanism for automatically determining and transmitting a geographic location of a vehicle. Vehicle location data, from one or more vehicles, can then be collected by a vehicle tracking system to manage an overview of vehicle travel. Most commonly, the vehicle location data is determined using a Global Positioning System (GPS), and can be transmitted from the vehicle to the vehicle tracking system via a Short Message Service (SMS) network, a General Packet Radio Service (GPRS) network, a satellite or terrestrial radio network, a cellular network, and/or the like.

BRIEF DESCRIPTION OF THE DRAWINGS

FIGS. 1A-1I are diagrams of an overview of an example implementation described herein;

DETAILED DESCRIPTION

The following detailed description of example implementations refers to the accompanying drawings. The same reference numbers in different drawings can identify the same or similar elements.

A GPS in a vehicle can collect location data at a particular rate (e.g., one Hertz or one data point per second). However, if the vehicle GPS reports (e.g., to a vehicle management system) the location data every second when traveling along a known route, the vehicle management system can receive a lot of location data about the known route. Much of this location data is useless to the vehicle management system, and is expensive to transmit due to costs associated with network data plans and server-side processing. Thus, the vehicle GPS typically reports the location data at a rate (e.g., one data point per minute) that is less than the particular rate at which the vehicle GPS collects the location data.

Some implementations described herein provide a device (e.g., provided in a vehicle) that dynamically reports location data for the vehicle based on a fitted history model. For example, the device can report more location data when the vehicle is traveling an unknown route, and can report less location data when the vehicle is traveling a known route. The device can receive, during a time period, location data associated with a location of the vehicle, and can receive historical map data associated with the location. The device can process the location data, with a fitted history model, to generate a vehicle path, and can process a portion of the location data, with the fitted history model, to generate a fitted history path. The device can compare the vehicle path and the fitted history path to determine whether the vehicle path and the fitted history path match. If the vehicle path and the fitted history path match, the device can report the portion of the location data. If the vehicle path and the fitted history path do not match, the device can add location data to the portion of the location data until the vehicle path and the fitted history path match, and can report the portion of the location data and the added location data.

Figure 1A:
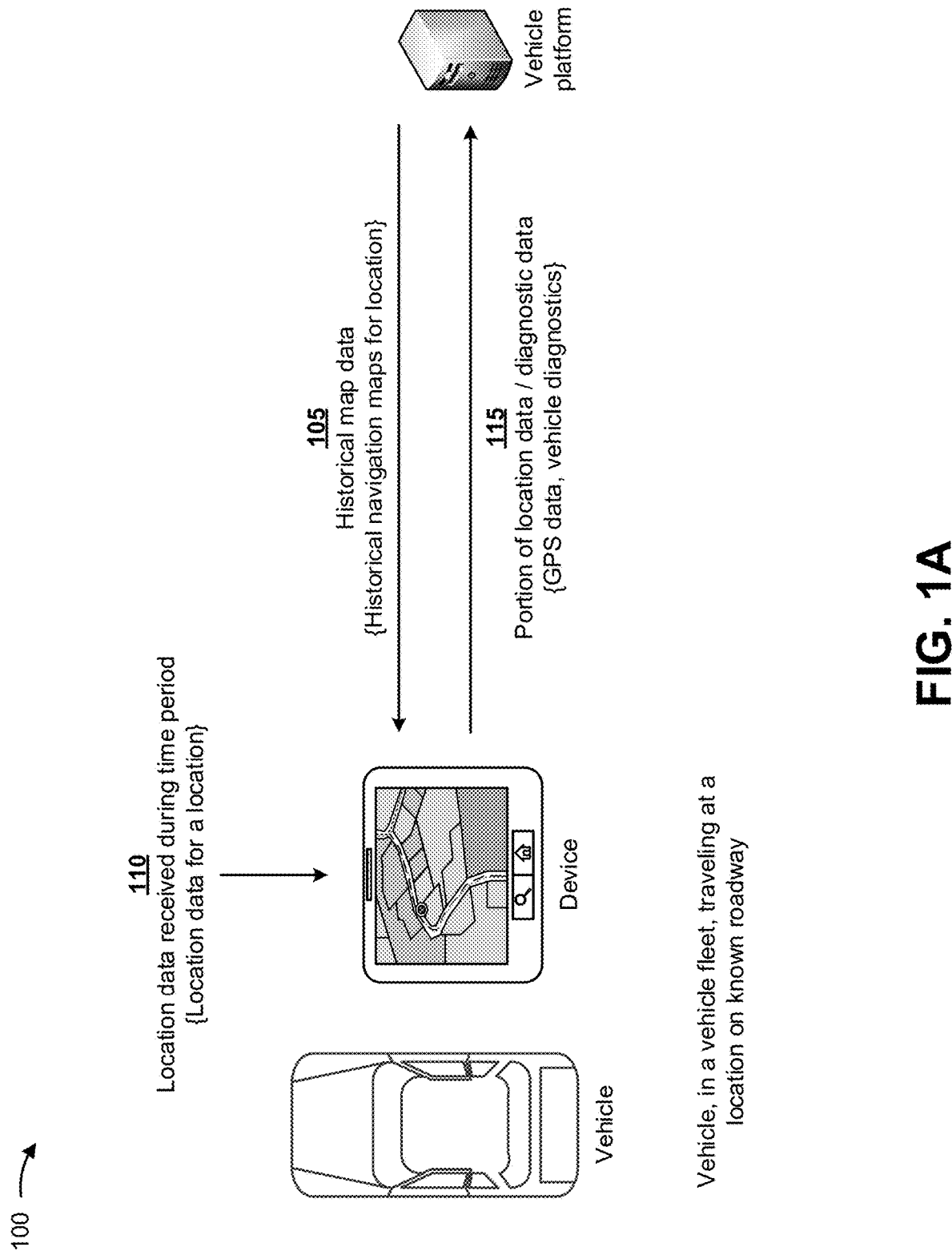

FIGS. 1A-1I are diagrams of an overview of an example implementation 100 described herein. As shown in FIG. 1A, a device can be associated with a vehicle and a vehicle platform. Assume that the vehicle is in a vehicle fleet (e.g., managed by the vehicle platform) and is traveling at a location on a known roadway during a time period. As shown in FIG. 1A, and by reference number 105, the vehicle platform can provide, to the device, historical map data. The device can receive the historical map data, and can store the historical map data in a memory associated with the device. In some implementations, the historical map data can include data associated with maps provided as graphs or two dimensional arrays of objects with attributes of location and category (e.g., a park, a road, a city, and/or the like), a road network along with associated features, a model of a road network that includes basic elements (e.g., nodes, links, areas, etc.) of the road network and properties of the elements (e.g., location coordinates, shapes, addresses, road class, speed range, etc.), points of interest, building shapes, boundaries, and/or the like.

As further shown in FIG. 1A, and by reference number 110, the device can receive location data during the time period. In some implementations, the location data can include data identifying a location (e.g., GPS coordinates) of the vehicle during the time period (e.g., one minute, two minutes, and/or the like). In some implementations, the device can receive the location data at a particular rate (e.g., one Hertz or one data point per second), and thus can receive sixty data points during a one minute time period.

As further shown in FIG. 1A, and by reference number 115, since the vehicle is traveling on a known roadway during the time period, the device can provide, to the vehicle platform, a portion of the location data and/or diagnostic data. In some implementations, the device may not report the sixty data points of the location data to the vehicle platform since the roadway is known, the extra data points are useless to the vehicle platform, and the extra data points are expensive to transmit. In some implementations, the portion of the location data can include one or more of the location data points (e.g., one or more of the sixty data points of the location data). In some implementations, the diagnostic data can include diagnostic data associated with the vehicle during the time period, such as data indicating a speed of the vehicle, a fuel level of the vehicle, a mileage of the vehicle, a tire pressure of the vehicle, and/or the like.

Figure 1B:
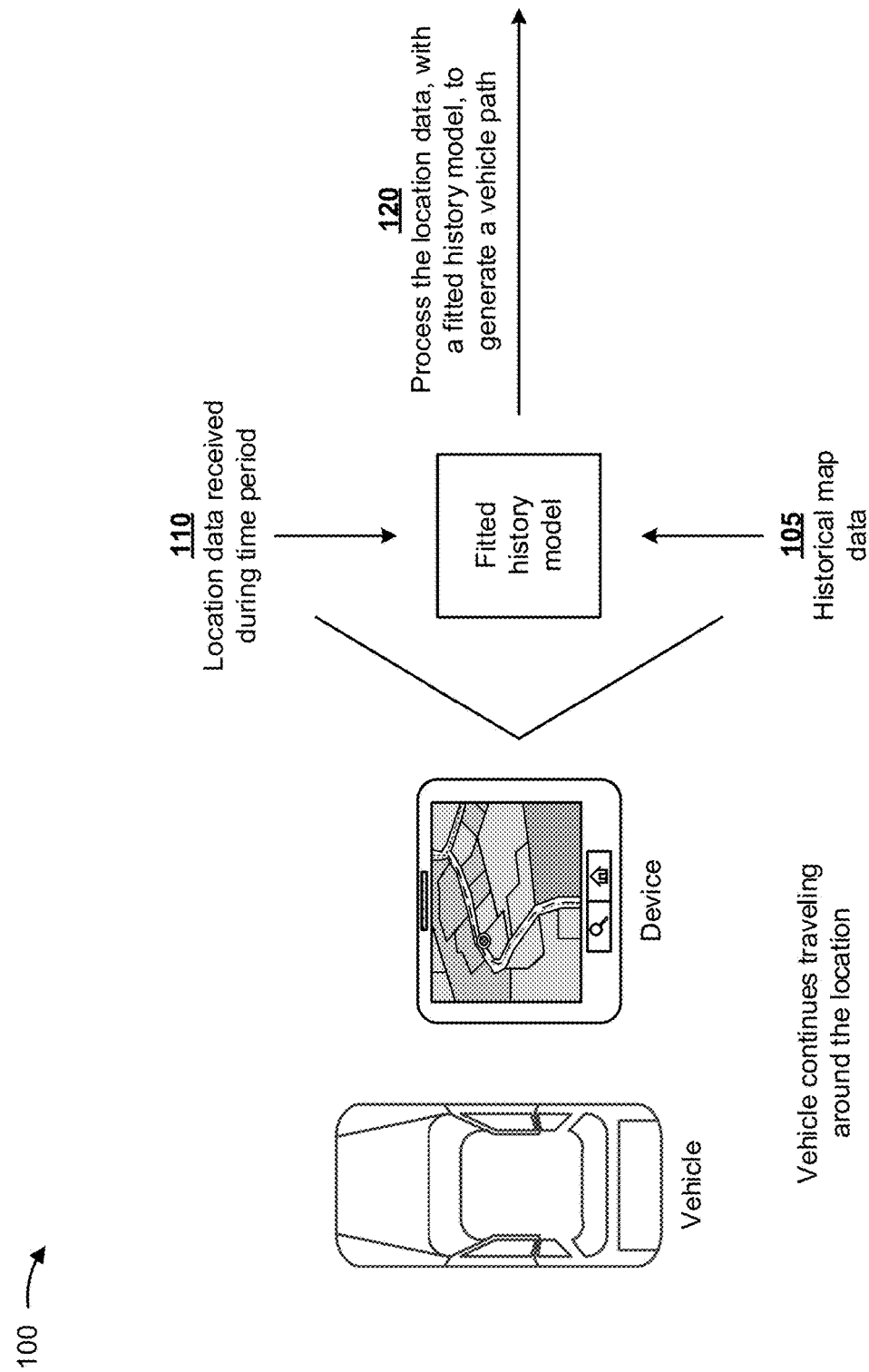

As shown in FIG. 1B, assume that the vehicle continues traveling around the location during the time period. As further shown in FIG. 1B, and by reference numbers 105 and 110, the device can provide the historical map data and the location data, received during the time period, to a fitted history model. In some implementations, the fitted history model can include a model that fits, infers, and/or interpolates a path or route between two known locations, as described elsewhere herein. In some implementations, the fitted history model can utilize one or more routing calculation techniques to determine a vehicle path, such as a Dijkstra technique, a Bellman-Ford technique, a Floyd-Warshall technique, Johnson's technique, a Viterbi technique, and/or the like, as described elsewhere herein.

As further shown in FIG. 1B, and by reference number 120, the device can process the location data (e.g., two data points of the location data), with the fitted history model, to generate the vehicle path for the vehicle during the time period. For example, the device can utilize a first data point and a second data point of the location data with the fitted history model, and the fitted history model can interpolate the vehicle path between the first data point and the second data point.

Figure 1C:
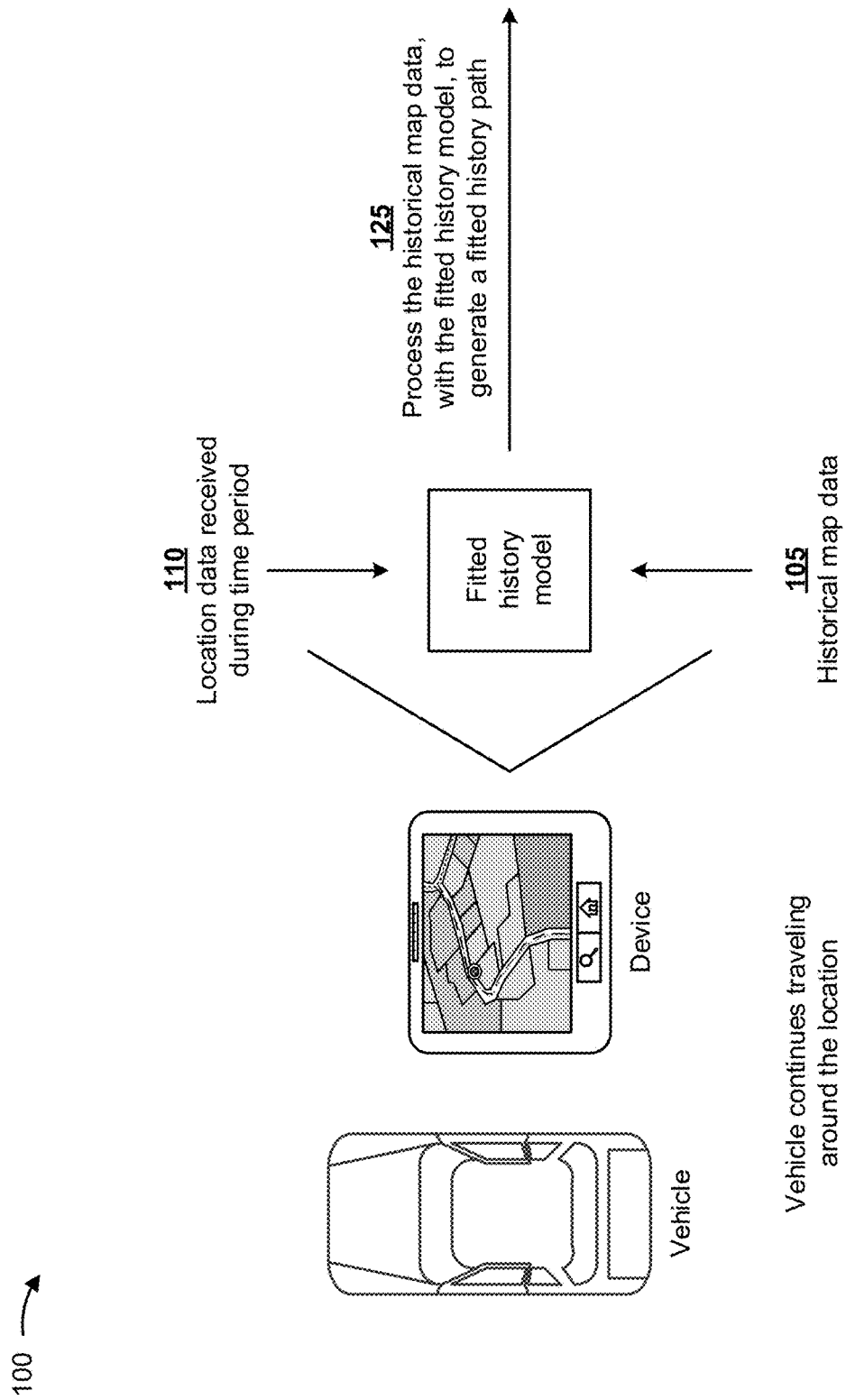

As shown in FIG. 1C, and by reference number 125, the device can process a portion of the location data, with the fitted history model, to generate a fitted history path for the vehicle during the time period (e.g., based on the historical map data). In some implementations, the fitted history model can include the features described elsewhere herein. In some implementations, the device can utilize the vehicle path and the historical map data with the fitted history model, and the fitted history model can determine the fitted history path, as close to a known route (e.g., a known road) as possible, based on the vehicle path.

Figure 1D:
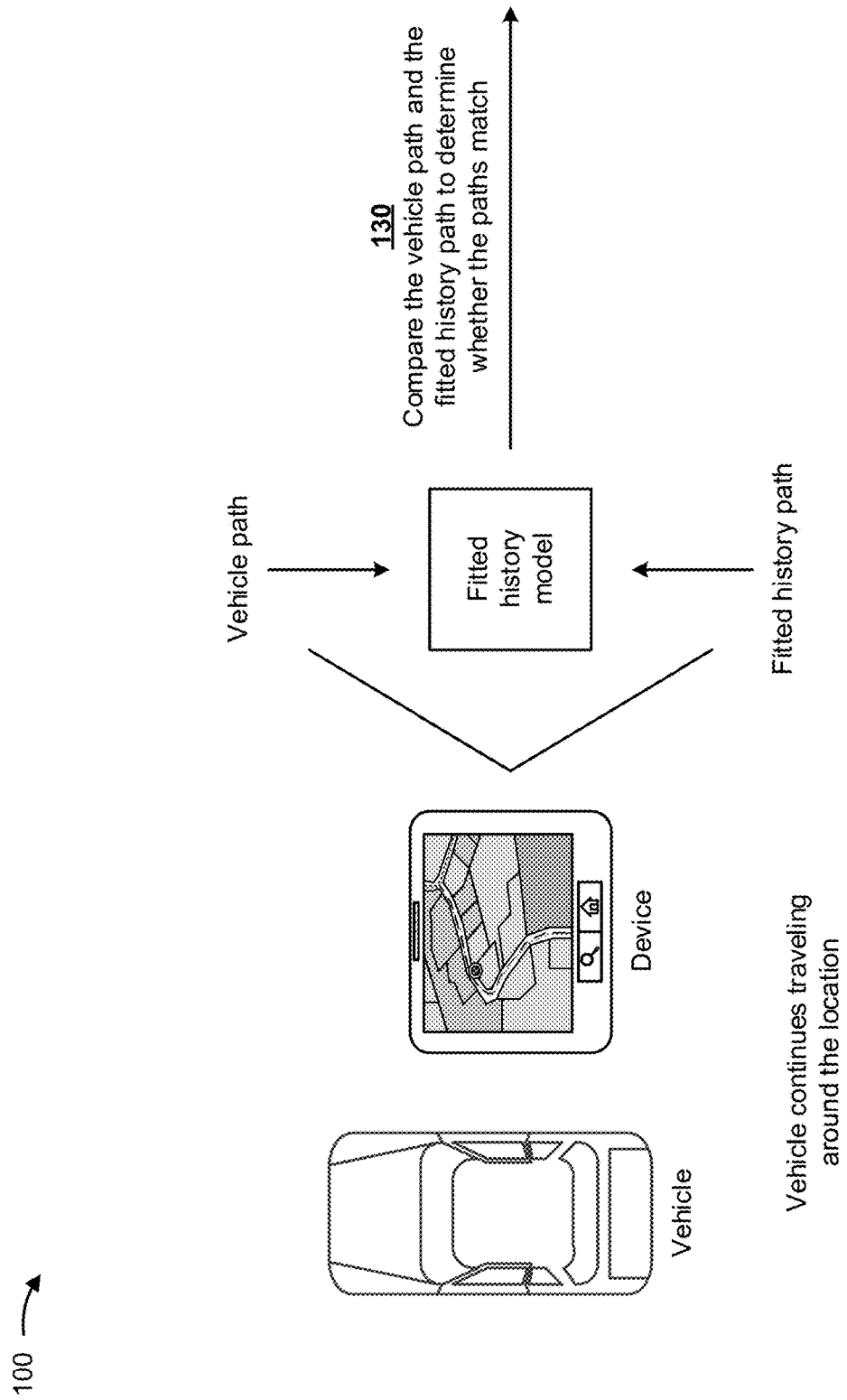

As shown in FIG. 1D, the device can utilize the vehicle path and the fitted history path with the fitted history model. As further shown in FIG. 1D, and by reference number 130, the device (e.g., via the fitted history model) can compare the vehicle path and the fitted history path to determine whether the vehicle path and the fitted history path match. In some implementations, the device can utilize one or more map matching techniques to determine whether the vehicle path and the fitted history path match, such as a Fréchet distance technique, a direct projection technique, a probabilistic statistics technique, a fuzzy logic technique, a geometric matching technique, a correlation coefficient technique, and/or the like, as described elsewhere herein.

Figure 1E:
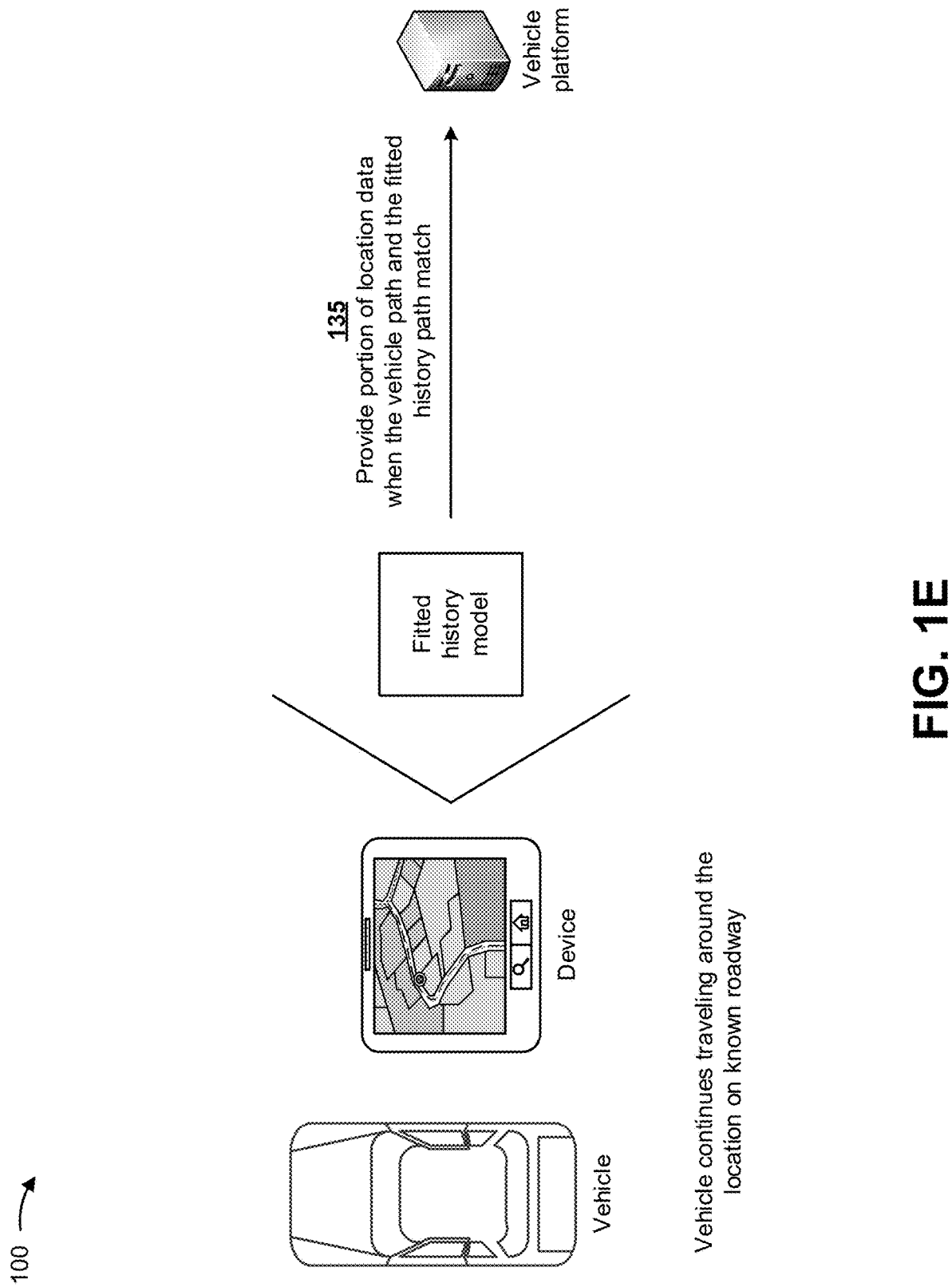

As shown in FIG. 1E, assume that the vehicle continues traveling around the location on the known roadway. In such situations, since the vehicle is traveling on the known roadway, the vehicle path will correspond with the fitted history path (e.g., the known roadway). Thus, the device can determine that the vehicle path and the fitted history path match based on comparing the vehicle path and the fitted history path. As further shown in FIG. 1E, and by reference number 135, the device (e.g., via the fitted history model) can provide, to the vehicle platform, a portion of the location data when the vehicle path and the fitted history path match. For example, the device can provide, to the vehicle platform, the first data point and a last data point of the location data when the vehicle path and the fitted history path match.

Figure 1F:
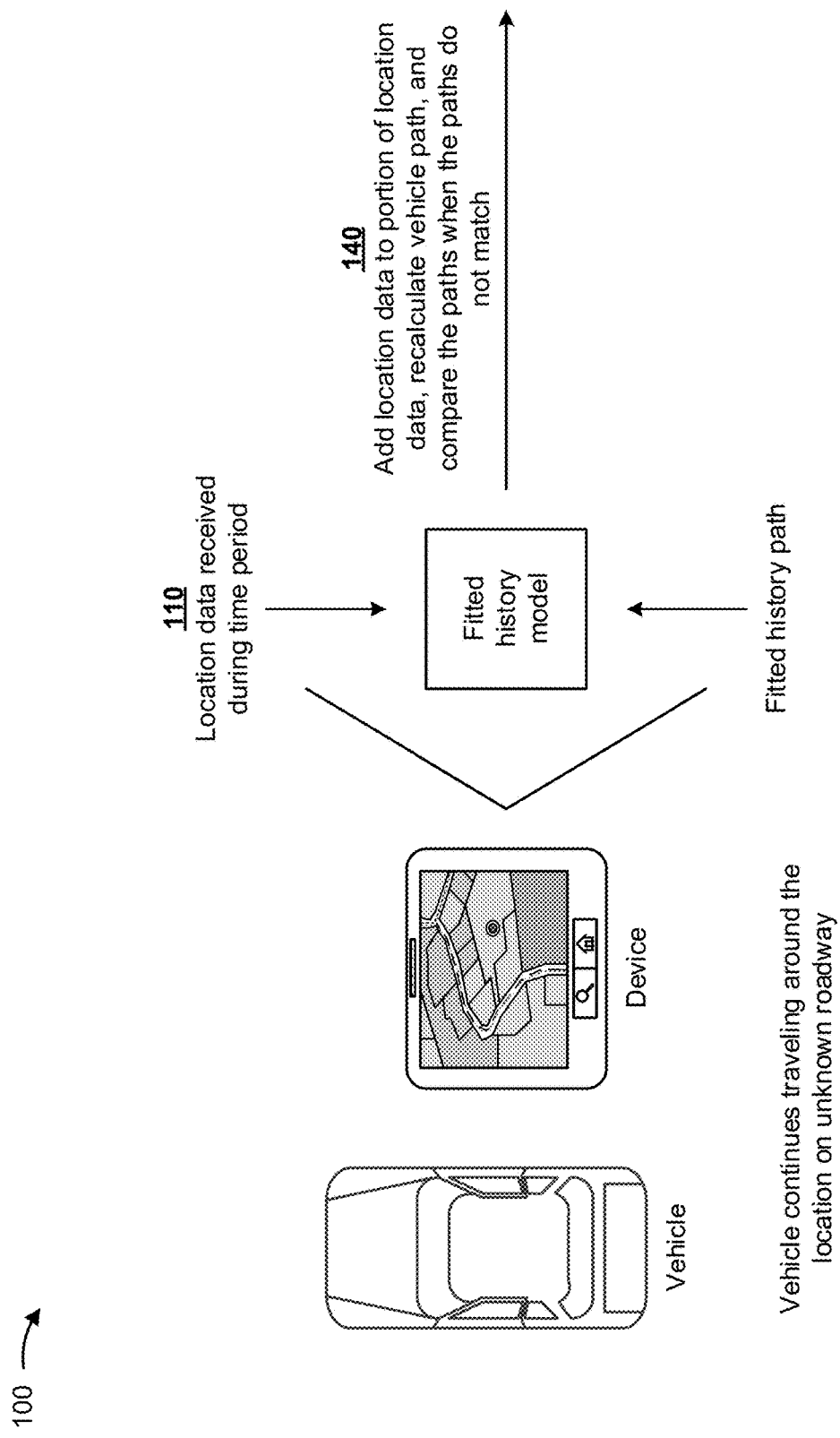

As shown in FIG. 1F, assume that the vehicle continues traveling around the location on an unknown roadway. In such situations, since the vehicle is traveling on the unknown roadway, the vehicle path (e.g., the unknown roadway) will not correspond with the fitted history path (e.g., a known roadway). Thus, the device can determine that the vehicle path and the fitted history path do not match based on comparing the vehicle path and the fitted history path.

As further shown in FIG. 1F, and by reference number 140, the device (e.g., via the fitted history model) can add location data to the portion of the location data, can recalculate the fitted history path with the added location data, and can compare the vehicle path and the recalculated fitted history path when the vehicle path and the fitted history path do not match. In some implementations, the device can continue to add location data to the portion of the location data, recalculate the fitted history path with the added location data, and compare the vehicle path and the recalculated fitted history path until the vehicle path and the recalculated fitted history path match.

As shown in FIG. 1G, and by reference number 145, the device (e.g., via the fitted history model) can provide, to the vehicle platform, the portion of the location data and the added location data when the vehicle path and the fitted history path eventually match. For example, the device can provide, to the vehicle platform, the first data point and the last data point of the location data, and one or more added location data points, which are added to the portion of the location data until the vehicle path and the fitted history path match.

Figure 1H:
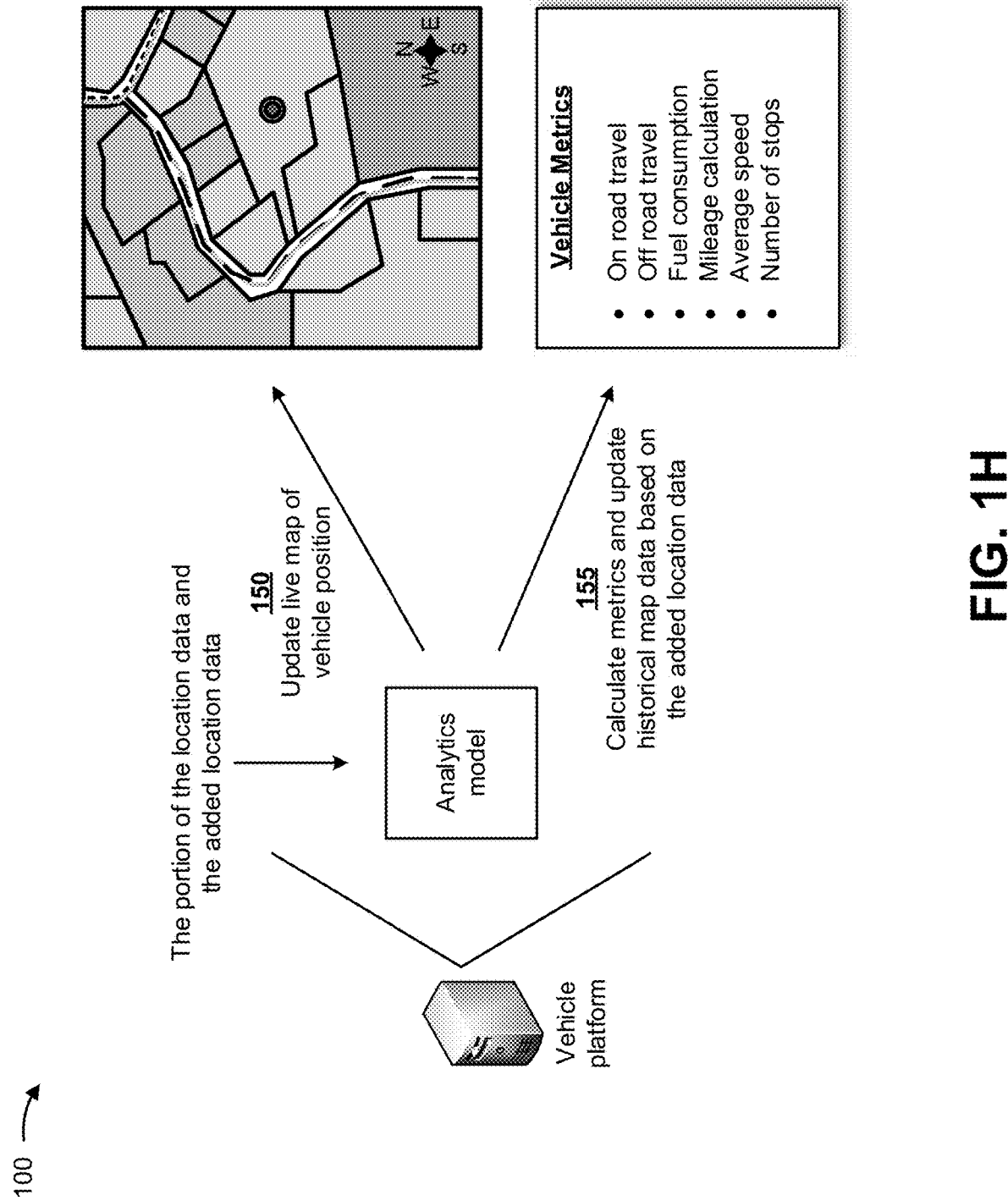

As shown in FIG. 1H, the vehicle platform can process the portion of the location data and the added location data with an analytics model. In some implementations, the analytics model can include a fleet management model that gathers, stores, processes, monitors, reports, exports, and/or the like information associated with a fleet of vehicles. In some implementations, the analytics model can calculate vehicle metrics (e.g., vehicle speed, clutch use, brake use, cruise control use, fuel consumption, fuel level, engine speed, total engine use hours, mileage, engine coolant temperature, and/or the like), can update live maps of vehicle positions, can update historical map data based on location data, and/or the like.

As further shown in FIG. 1H, and by reference number 150, the vehicle platform can process the portion of the location data and the added location data, with the analytics model, to update a live map of a position of the vehicle. In some implementations, the live map can be updated to indicate that the vehicle is traveling on an unknown road that is near one or more known roads. In some implementations, the updated live map can provide an operator of the vehicle platform with information indicating locations of all vehicles in a vehicle fleet, which can aid the operator with managing the vehicle fleet.

As further shown in FIG. 1H, and by reference number 155, the vehicle platform can process the portion of the location data and the added location data, with the analytics model, to calculate vehicle metrics (e.g., metrics indicating on road travel, off road travel, fuel consumption, mileage calculation, average speed, number of stops, and/or the like) and to update the historical map data with the added location data. In some implementations, the vehicle platform can update the historical map data to include the location data associated with the unknown road. In such implementations, the vehicle platform can provide the updated historical map data to one or more vehicles in the vehicle fleet.

Figure 1I:
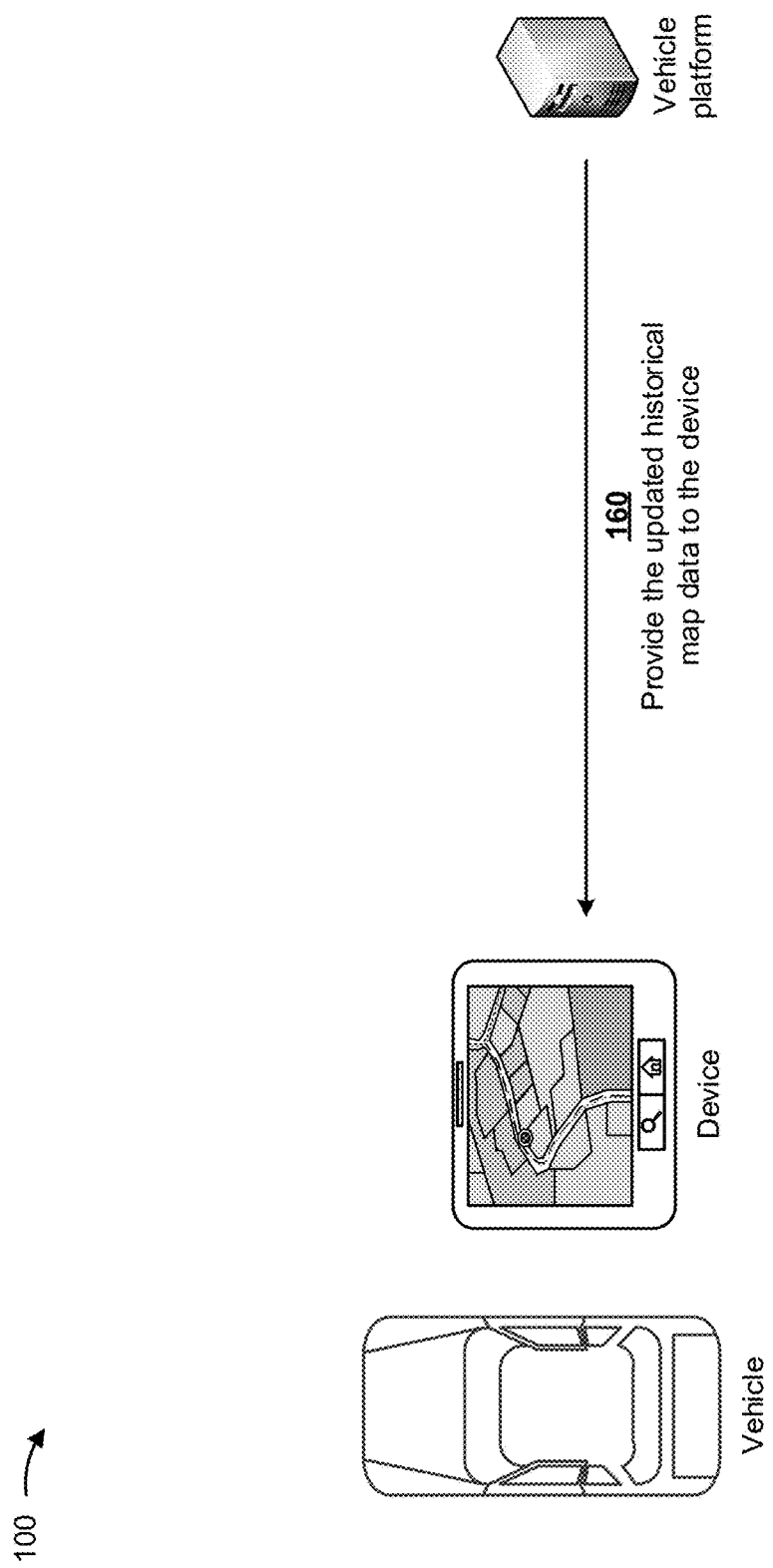

As shown in FIG. 1I, and by reference number 160, the vehicle platform can provide, to the device, the updated historical map data. The device can display the updated historical map data (e.g., via a user interface). For example, the user interface can include the unknown road as a known road in a map of the location of the vehicle. In some implementations, the vehicle platform can provide the updated historical map data to one or more other devices associated with one or more other vehicles in the vehicle fleet.

In this way, several different stages of the process for reporting vehicle location data are automated, which can remove human subjectivity and waste from the process, and which can improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. These roles can include dynamically reporting location data for a vehicle based on whether the vehicle is traveling on a known route or an unknown route, and/or the like. Finally, dynamically reporting location data for a vehicle based on whether the vehicle is traveling on a known route or an unknown route conserves computing resources (e.g., processor resources, memory resources, network resources, and/or the like) that would otherwise be wasted in providing known location data to a vehicle platform.

As indicated above, FIGS. 1A-1I are provided merely as examples. Other examples are possible and can differ from what was described with regard to FIGS. 1A-1I.

Figure 2:
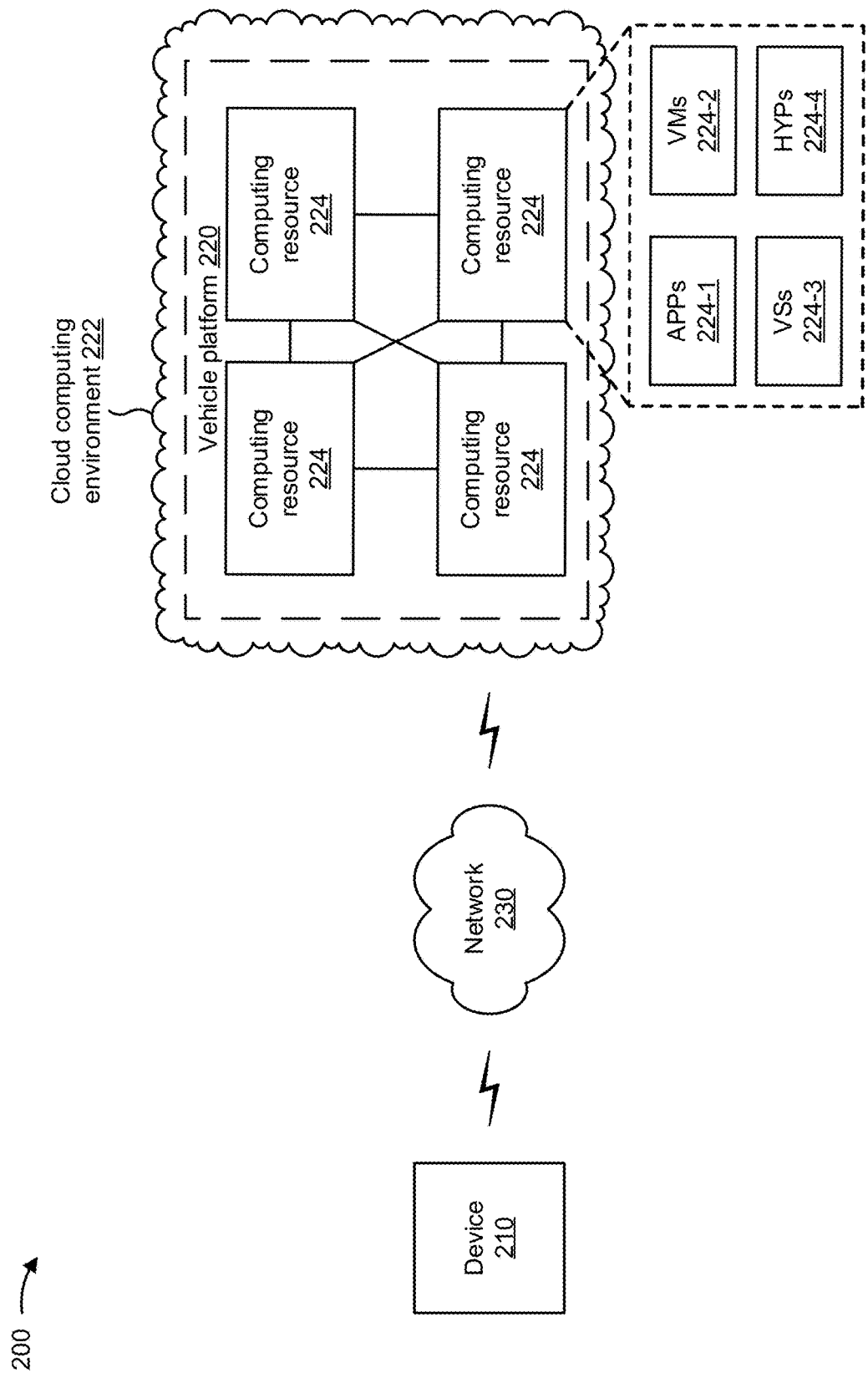
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a device 210, a vehicle platform 220, and a network 230. Devices of environment 200 can interconnect via wired connections, wireless connections, or a combination of wired and wireless connections.

Device 210 includes one or more devices capable of receiving, generating, storing, processing, and/or providing information, such as information described herein. In some implementations, device 210 dynamically reports location data for a vehicle based on a fitted history model. For example, device 210 can include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a GPS device, a telematics device, an onboard diagnostic device, a vehicle electronic control unit (ECU), or a similar type of device. In some implementations, device 210 can receive information from and/or transmit information to vehicle platform 220. In some implementations, device 210 can be physically separate from, but communicate with, the vehicle. In some implementations, device 210 can be physically incorporated within, and communicate with, the vehicle.

Vehicle platform 220 includes one or more devices that monitors and manages a fleet of vehicles, such as the vehicle associated with device 210. In some implementations, vehicle platform 220 can be designed to be modular such that certain software components can be swapped in or out depending on a particular need. As such, vehicle platform 220 can be easily and/or quickly reconfigured for different uses. In some implementations, vehicle platform 220 can receive information from and/or transmit information to one or more devices 210.

In some implementations, as shown, vehicle platform 220 can be hosted in a cloud computing environment 222. Notably, while implementations described herein describe vehicle platform 220 as being hosted in cloud computing environment 222, in some implementations, vehicle platform 220 may not be cloud-based (i.e., may be implemented outside of a cloud computing environment) or may be partially cloud-based.

Cloud computing environment 222 includes an environment that hosts vehicle platform 220. Cloud computing environment 222 can provide computation, software, data access, storage, etc. services that do not require end-user knowledge of a physical location and configuration of system(s) and/or device(s) that hosts vehicle platform 220. As shown, cloud computing environment 222 can include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 can host vehicle platform 220. The cloud resources can include compute instances executing in computing resource 224, storage devices provided in computing resource 224, data transfer devices provided by computing resource 224, etc. In some implementations, computing resource 224 can communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that can be provided to or accessed by device 210. Application 224-1 can eliminate a need to install and execute the software applications on device 210. For example, application 224-1 can include software associated with vehicle platform 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., a user of device 210 or an operator of vehicle platform 220), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 can provide hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
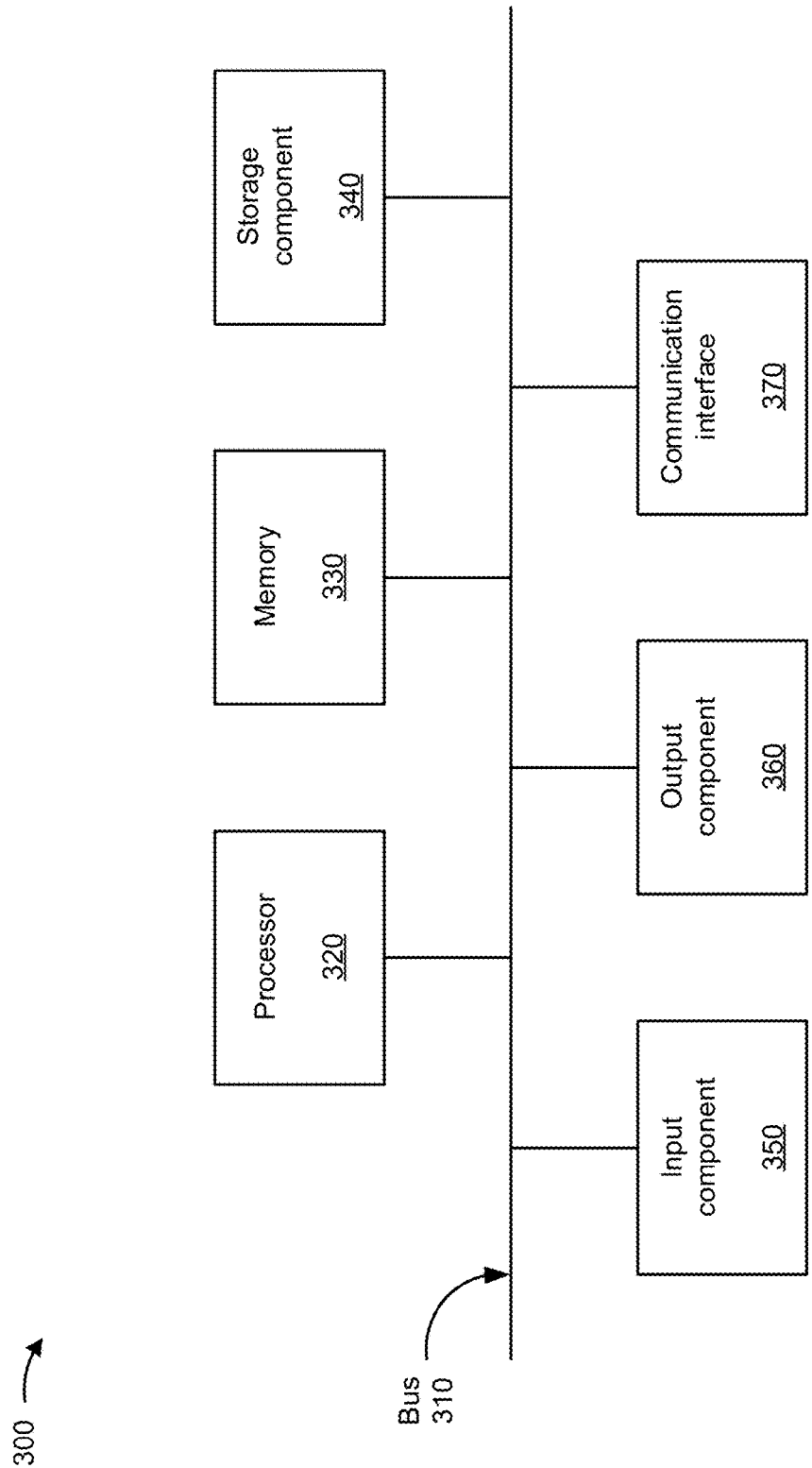
FIG. 3 is a diagram of example components of one or more devices of FIG. 2.

FIG. 3 is a diagram of example components of a device 300. Device 300 can correspond to device 210, vehicle platform 220, and/or computing resource 224. In some implementations, device 210, vehicle platform 220, and/or computing resource 224 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
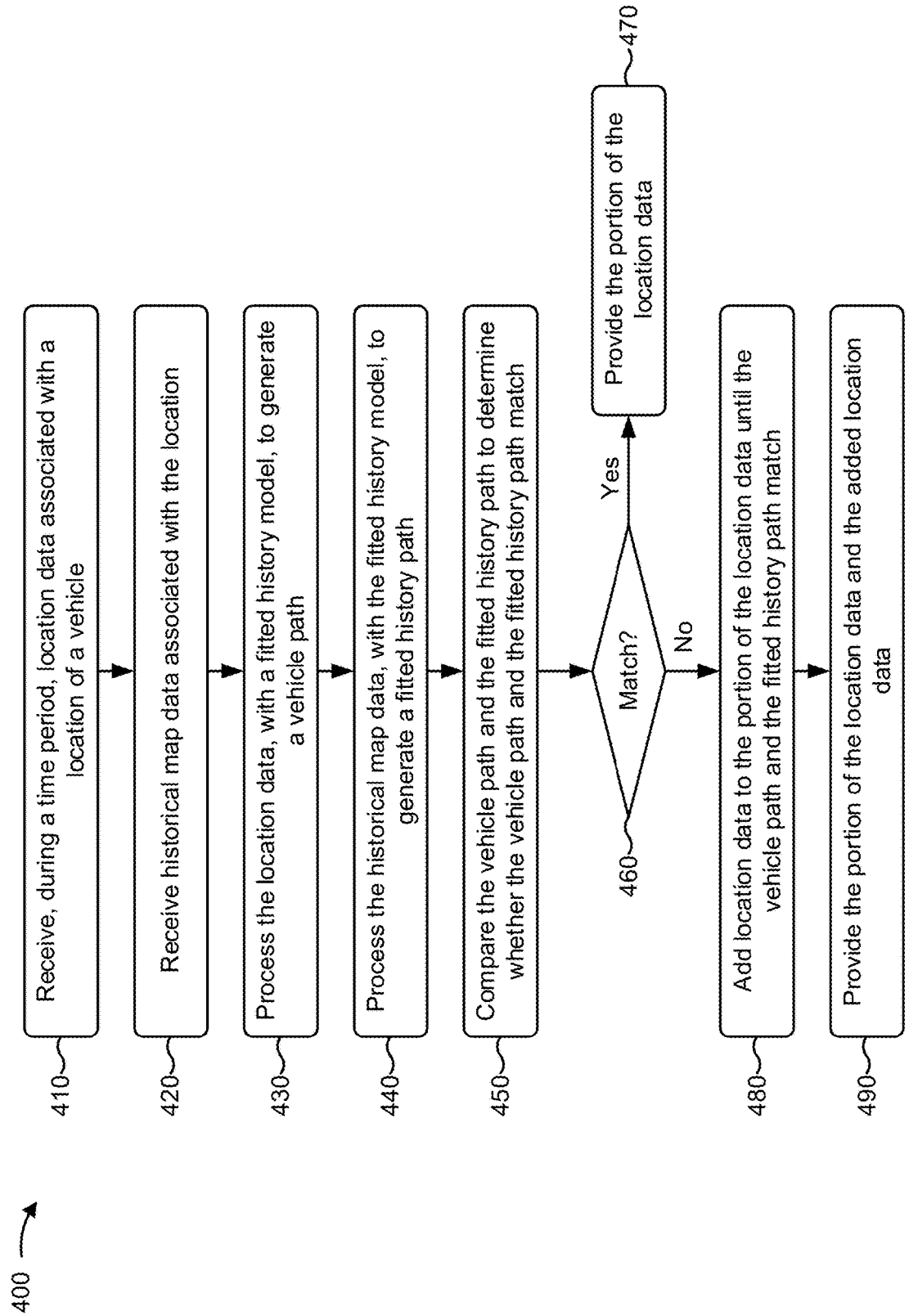
FIG. 4 is a flow chart of an example process for dynamic reporting of location data for a vehicle based on a fitted history model.

FIG. 4 is a flow chart of an example process 400 for dynamic reporting of location data for a vehicle based on a fitted history model. In some implementations, one or more process blocks of FIG. 4 can be performed by device 210. In some implementations, one or more process blocks of FIG. 4 can be performed by another device or a group of devices separate from or including device 210, such as vehicle platform 220.

As shown in FIG. 4, process 400 can include receiving, during a time period, location data associated with a location of a vehicle (block 410). For example, device 210 (e.g., using processor 320, memory 330, communication interface 370, and/or the like) can receive, during a time period, location data associated with a location of a vehicle. In some implementations, the location data can include data identifying a location of the vehicle during the time period (e.g., one minute, two minutes, and/or the like). For example, the location data can include GPS coordinates of the vehicle, location data of the vehicle that is determined based on cellular base stations, wireless access points, and/or radio broadcast towers adjacent to the vehicle, and/or the like. In some implementations, device 210 can receive the location data at a particular rate (e.g., one Hertz or one data point per second). In such implementations, device 210 can receive sixty data points during a one minute time period. In some implementations, device 210, or a user of device 210, can adjust a rate at which the location data is received by device 210.

In this way, device 210 can receive, during the time period, the location data associated with the location of the vehicle.

As further shown in FIG. 4, process 400 can include receiving historical map data associated with the location (block 420). For example, device 210 (e.g., using processor 320, memory 330, communication interface 370, and/or the like) can receive historical map data associated with the location. In some implementations, device 210 can receive the historical map data at any time prior to receiving the location data associated with the location. For example, device 210 can be preloaded with the historical map data, and can periodically receive updates to the historical map data. In another example, device 210 can periodically receive the historical map data.

In some implementations, device 210 can receive the historical map data from vehicle platform 220, from one or more resources that provide map data, from a combination of vehicle platform 220 and the one or more resources, and/or the like. In some implementations, device 210 can store the historical map data in a memory associated with device 210.

In some implementations, the historical map data can include data associated maps provided as graphs or two dimensional arrays of objects with attributes of location and category (e.g., a park, a road, a city, and/or the like), a road network along with associated features, a model of a road network that includes basic elements (e.g., nodes, links, areas, etc.) of the road network and properties of the elements (e.g., location coordinates, shapes, addresses, road class, speed range, etc.), points of interest, building shapes, boundaries, and/or the like. In some implementations, the historical map data can include map data associated with locations to which the vehicle is to travel in the future, map data associated with all locations of a particular geographical region, map data associated with all locations of a particular country, and/or the like. In some implementations, device 210 can store particular historical map data associated with locations to which the vehicle is to travel in the future, and can delete the particular historical map data after the vehicle travels to the locations. In such implementations, device 210 can then store other historical map data associated with new locations to which the vehicle is to travel in the future.

In this way, device 210 can receive the historical map data associated with the location.

As further shown in FIG. 4, process 400 can include processing the location data, with a fitted history model, to generate a vehicle path (block 430). For example, device 210 (e.g., using processor 320, memory 330, communication interface 370, and/or the like) can process the location data, with a fitted history model, to generate a vehicle path. In some implementations, the fitted history model can include a model that fits, infers, and/or interpolates a path or route between two known locations, as described elsewhere herein.

In some implementations, the fitted history model can calculate, fit, infer, and/or interpolate a vehicle path between two data points of the location data received by the device during the time period. In such implementations, the fitted history model can determine a most likely or a most probable actual path traveled by the vehicle (e.g., a vehicle path) between the two data points of the location data. In some implementations, the fitted history model can determine the vehicle path based on the location data and/or other vehicle data (e.g., the diagnostic data, vehicle speed data, vehicle heading data, historical route data based on similar or same routes traveled in the past, historical driver data, and/or the like).

In some implementations, the fitted history model can utilize one or more routing calculation techniques to determine the vehicle path, such as a Dijkstra technique, a Bellman-Ford technique, a Floyd-Warshall technique, Johnson's technique, a Viterbi technique, and/or the like.

The Dijkstra technique can include a technique for finding shortest paths between nodes in a graph, which may represent, for example, locations in a network of roads. For a given source node, the Dijkstra technique can find a shortest path between a source node and every other node, and thereby identify a shortest path from the source node to a destination node. The Dijkstra technique traverses the graph from the source node to each other node via all possible routes, and assigns each other node a value representing the distance from the source node to that route, starting with an overestimate (e.g., infinity) and replacing the value if the distance via the currently considered path is less than the current value. In this way, the Dijkstra technique can be applied to identify a shortest path from a source location to a destination location via a network of roads over which a vehicle can travel.

The Bellman-Ford technique can include a technique for finding shortest paths from a single source node to all other nodes in a weighted digraph. For a given source node, the Bellman-Ford technique can find a shortest path between a source node to a destination node. The Bellman-Ford technique works similarly to the Dijkstra technique, but compares distances and updates values for all nodes, whereas the Dijkstra technique compares distances and updates values for the neighbors of a closest node not yet processed.

The Floyd-Warshall technique can include a technique for finding a shortest path between any two nodes (e.g., source and destination) in a graph. Whereas the Dijkstra technique and the Bellman-Ford technique are single-source shortest path (SSSP) techniques (which compute shortest path distances from a chosen source node to every other node in the graph), the Floyd-Warshall technique is an all pairs shortest path (APSP) technique that can compute the shortest path between any two nodes in the graph. In this way, the Floyd-Warshall technique can be applied to identify a shortest path from any source location to any destination location via a network of roads over which a vehicle can travel.

Johnson's technique can include a technique to find shortest paths between all pairs of vertices in a sparse, edge-weighted, directed graph. Johnson's technique employs the Bellman-Ford technique to compute a transformation of an input graph that removes all negative weights. This allows the Dijkstra's technique to be used on the transformed graph.

The Viterbi technique can include a dynamic programming technique for finding the most likely sequence of hidden states (called the Viterbi path) that results in a sequence of observed events, such as in the context of Markov information sources and hidden Markov models. In this case, the Viterbi technique can be applied as an optimized searching technique for finding a shortest path between two points. For example, the Viterbi technique can employ the principle that, if the shortest path between point A and point C passes an intermediate point B, then the segment (of this path) that is between point A and point B is the shortest path between these two points. The Viterbi technique consists of two steps: forward shortest-path accumulation and backward descending tracking.

In this way, device 210 can process the location data, with the fitted history model, to generate the vehicle path.

As further shown in FIG. 4, process 400 can include processing a portion of the location data, with the fitted history model, to generate a fitted history path (block 440). For example, device 210 (e.g., using processor 320, memory 330, communication interface 370, and/or the like) can process a portion of the location data, with the fitted history model, to generate a fitted history path (e.g., based on the historical map data). In some implementations, the fitted history model can include the features described elsewhere herein. In some implementations, device 210 can utilize the vehicle path and the historical map data with the fitted history model, and the fitted history model can determine the fitted history path, as close to a known route (e.g., a known road) as possible, based on the vehicle path.

In some implementations, device 210 (e.g., via the fitted history model) may be unable to determine the fitted history path close to a known route when the vehicle is traveling on unknown routes, such as when the vehicle traveling at a seaport, a construction location, a forestry location, an oil and gas location, and/or the like. In such implementations, device 210 (e.g., via the fitted history model) can determine the fitted history path as close to a last known route, traveled by the vehicle, as possible.

In this way, device 210 can process the portion of the location data, with the fitted history model, to generate the fitted history path.

As further shown in FIG. 4, process 400 can include comparing the vehicle path and the fitted history path to determine whether the vehicle path and the fitted history path match (block 450). For example, device 210 (e.g., using processor 320, memory 330, communication interface 370, and/or the like) can compare the vehicle path and the fitted history path to determine whether the vehicle path and the fitted history path match. In some implementations, device 210 (e.g., via the fitted history model) can compare the vehicle path and the fitted history path to determine whether the vehicle path and the fitted history path match. In some implementations, device 210 can utilize one or more map matching techniques to determine whether the vehicle path and the fitted history path match, such as a Fréchet distance technique, a direct projection technique, a probabilistic statistics technique, a fuzzy logic technique, a geometric matching technique, a correlation coefficient technique, and/or the like.

The Fréchet distance technique may include a measure of similarity between curves that takes into account location and ordering of points along the curves. In the technique, it is assumed that S is a metric space, a curve A in S is a continuous map from a unit interval into S (e.g., A:[0, 1]→S), and a reparameterization α of [0, 1] is a continuous, non-decreasing, surjection (e.g., α:[0, 1]→[0, 1]). If A and B are two curves in S, then, the Fréchet distance (F) between A and B may be an infimum over all reparameterizations α and β of [0, 1] of a maximum over all t ∈ [0, 1] of a distance in S between A(α(t)) and B(β(t)), as provided by the following equation: $F(A, B) = \inf_{\alpha,\beta} \max_{t \in [0, 1]} \{d(A(\alpha(t)), B(\beta(t)))\}$.

The direct projection technique can include a position mapping technique that gathers near roads from a GPS location in an electronic map database, calculates a shortest geometric distance of a positioning point to each candidate path, and chooses a shorter candidate road to match a best choice. The locations are directly projected to the determined and optimal matching path, and the matching points representing the GPS coordinates are used as the current location information of the vehicle. The direct projection technique may use longitude and latitude coordinates, direction, speed, historical track, matching error information, and/or the like.

The probabilistic statistics technique can include a map matching technique that defines an elliptical or rectangular confidence region around a position fix obtained from a navigation sensor. An error region can be superimposed on the road network to identify a road segment on which the vehicle is travelling. If an error region contains a number of segments, the probabilistic statistics technique can evaluate the candidate segments using heading, connectivity, closeness criteria, speed of the vehicle, and/or the like. The probabilistic statistics technique can identify a best match segment and a most probable matching point on the segment.

The fuzzy logic technique can include a map matching technique that employs fuzzy logic to determine whether the vehicle path and the fitted history path match. For example, the fuzzy logic technique can include selection of fuzzy inputs and outputs, selection of fuzzy sets and corresponding membership functions, definition of fuzzy rules for a fuzzy inference system (e.g., a Sugeno fuzzy inference system), and defuzzification to produce a crisp output. In some implementations, the fuzzy logic technique can include applying a first fuzzy inference system to perform an initial map matching process (IMP), a second fuzzy inference system to perform a subsequent map matching process (SMP) along a link, and a third fuzzy inference system to perform an SMP at a junction. The first fuzzy inference system can identify the correct link in the road network by applying fuzzy rules based on velocity of the vehicle, horizontal dilution of precision, perpendicular distance to the link, heading error, and/or the like, to determine a probability of matching a position fix to a candidate link. The second fuzzy inference system can check if the vehicle has already crossed a junction or is about to cross a junction and, if not, match subsequent positions to the link identified by the IMP by applying fuzzy rules based on velocity of the vehicle, heading increment, and/or the like, to generate a threshold value used to determine if the position fix should be matched to the previously selected link. The third fuzzy inference system can, if the vehicle has crossed a junction, identify a new link among the candidate links by applying fuzzy rules based on link connectivity, distance error, and/or the like, to determine the likelihood of a candidate link to be the correct link.

The geometric matching technique can include a map matching technique that uses geometric information, such as shape of line segments (e.g., road center-lines that define a road network). The geometric matching technique can include a point-to-point matching technique, a point-to-curve matching technique, or a curve-to-curve matching technique. A point-to-point matching technique identifies a node of a road segment that is closest to a GPS position, belonging to any of the trajectories within a specified range of the GPS position. A point-to-curve matching technique identifies a curve of a road network that is closest to a GPS position. A curve-to-curve matching technique first identifies candidate nodes using point-to-point matching and, for a candidate node, constructs piecewise linear curves from the paths that originate from that node. The curve-to-curve matching technique then constructs piecewise linear curves using the vehicle's trajectory and determines the distance between this curve and the curve corresponding to the road network, and the road arc which is closest to the curve formed from positioning points is taken as the one on which the vehicle is apparently travelling.

The correlation coefficient technique can include a map matching technique that employs a correlation coefficient. A correlation coefficient is a numerical measure of a correlation (e.g., a statistical relationship) between two variables. For example, the variables may be two columns of a given data set of observations, which may be referred to as a sample. Correlation coefficients assume values in the range from −1 to +1, where +1 indicates the strongest possible agreement and −1 the strongest possible disagreement. As one example, a Pearson correlation coefficient is a measure of the strength and direction of the linear relationship between two variables that is defined as the covariance of the variables divided by the product of their standard deviations.

In this way, device 210 can compare the vehicle path and the fitted history path to determine whether the vehicle path and the fitted history path match.

As further shown in FIG. 4, if the vehicle path and the fitted history path match (block 460—YES), process 400 can include providing the portion of the location data (block 470). For example, device 210 (e.g., using processor 320, memory 330, communication interface 370, and/or the like) can determine that the vehicle path and the fitted history path match, and can provide the portion of the location data based on determining that the vehicle path and the fitted history path match.

In some implementations, if the vehicle is traveling on a known roadway, the vehicle path will correspond with the fitted history path (e.g., the known roadway). In such implementations, device 210 can determine that the vehicle path and the fitted history path match based on comparing the vehicle path and the fitted history path. In some implementations, device 210 (e.g., via the fitted history model) can provide, to vehicle platform 220, a portion of the location data when the vehicle path and the fitted history path match. For example, device 210 can provide, to vehicle platform 220, the first data point and the last data point of the location data when the vehicle path and the fitted history path match.

In some implementations, device 210 can provide or report, to vehicle platform 220, the location data at a rate that is less than a rate at which the location data is received by device 210 when the vehicle path and the fitted history path match. In such implementations, device 210 can report less location data since the fitted history path calculated by vehicle platform 220 may be sufficiently close to the vehicle path that the two can be considered equivalent, and the extra location data may not be useful for improving the map data because the map data may be accurate since the two paths match. In this way, device 210 can conserve network resources that would otherwise be wasted in transmitted known location data to vehicle platform 220.

In this way, device 210 can determine that the vehicle path and the fitted history path match, and can provide the portion of the location data based on determining that the vehicle path and the fitted history path match.

As further shown in FIG. 4, if the vehicle path and the fitted history path do not match (block 460—NO), process 400 can include adding location data to the portion of the location data until the vehicle path and the fitted history path match (block 480). For example, device 210 (e.g., using processor 320, memory 330, communication interface 370, and/or the like) can determine that the vehicle path and the fitted history path do not match, and can add location data to the portion of the location data until the vehicle path and the fitted history path match.

In some implementations, if the vehicle is traveling on an unknown roadway, the vehicle path (e.g., the unknown roadway) will not correspond with the fitted history path (e.g., a known roadway). In such implementations, device 210 can determine that the vehicle path and the fitted history path do not match based on comparing the vehicle path and the fitted history path.

In some implementations, device 210 (e.g., via the fitted history model) can add location data to the portion of the location data, can recalculate the fitted history path with the added location data, and can compare the vehicle path and the recalculated fitted history path when the vehicle path and the fitted history path do not match. For example, when the vehicle path and the fitted history path do not match, device 210 can identify other location data points (e.g., one or more data points in the sixty data points received by device 210) to add to the vehicle path. In such an example, device 210 can determine where the vehicle path and the fitted history path have a greatest deviation, and can add a location data point associated with the greatest deviation. Device 210 can recalculate the fitted history path with the location data point associated with the greatest deviation, and can compare the vehicle path and the recalculated fitted history path to determine whether the vehicle path and the recalculated fitted history path match.

In some implementations, device 210 can continue to add location data to the portion of the location data, recalculate the fitted history path with the added location data, and compare the vehicle path and the recalculated fitted history path until the vehicle path and the recalculated fitted history path match. For example, device 210 can continuously add location data points to the portion of the location data, recalculate the fitted history path with the added location data points, and compare the vehicle path and the recalculated fitted history path until the vehicle path and the recalculated fitted history path match.

In this way, device 210 can determine that the vehicle path and the fitted history path do not match, and can add the location data to the portion of the location data until the vehicle path and the fitted history path match.

As further shown in FIG. 4, process 400 can include providing the portion of the location data and the added location data (block 490). For example, device 210 (e.g., using processor 320, memory 330, communication interface 370, and/or the like) can provide the portion of the location data and the added location data. In some implementations, device 210 (e.g., via the fitted history model) can provide, to vehicle platform 220, the portion of the location data and the added location data when the vehicle path and the fitted history path eventually match. For example, device 210 can provide, to vehicle platform 220, the first data point and the last data point of the location data, and one or more added location data points, which are continuously added to the portion of the location data until the vehicle path and the fitted history path match.

In some implementations, device 210 can provide or report, to vehicle platform 220, more location data (e.g., the portion of the location data and the added location data) than reported by device 210 when the vehicle path and the fitted history path match. In such implementations, device 210 can report more location data since the location data is not known by vehicle platform 220. In this way, device 210 can provide vehicle platform 220 with enough location data so that vehicle platform 220 can identify location data associated with an unknown route (e.g., an unknown road) and can update the historical map data with the unknown route.

In this way, device 210 can provide the portion of the location data and the added location data.

In some implementations, vehicle platform 220 can process the portion of the location data and the added location data with an analytics model, as described elsewhere herein. In some implementations, vehicle platform 220 can process the portion of the location data and the added location data, with the analytics model, to update a live map of a position of the vehicle. In some implementations, the live map can be updated to indicate that the vehicle is traveling on an unknown road that is near one or more known roads. In some implementations, the updated live map can provide an operator of the vehicle platform with information indicating locations of all vehicles in a vehicle fleet, which can aid the operator with managing the vehicle fleet.

In some implementations, vehicle platform 220 can process the portion of the location data and the added location data, with the analytics model, to calculate vehicle metrics (e.g., metrics indicating on road travel, off road travel, fuel consumption, mileage calculation, average speed, number of stops, and/or the like) and to update the historical map data with the added location data. In some implementations, vehicle platform 220 can utilize the vehicle metrics to calculate vehicle costs, calculate taxes associated with roadway use, and/or the like. In some implementations, vehicle platform 220 can update the historical map data to include the location data associated with the unknown road. In such implementations, vehicle platform 220 can provide the updated historical map data to one or more vehicles in the vehicle fleet. In some implementations, device 210 can update the historical map data based on the location data and the added location data, and can provide the updated historical map data to vehicle platform 220.

In some implementations, vehicle platform 220 can provide, to device 210, the updated historical map data. Device 210 can display the updated historical map data (e.g., via a user interface). In some implementations, vehicle platform 220 can provide the updated historical map data to one or more other devices associated with one or more other vehicles in the vehicle fleet.

In some implementations, vehicle platform 220 can process the added location data to create location data that augments a current location of the vehicle or that can be used by vehicle platform 220 to automatically detect access paths or show a trail that assists in creation of access paths.

In some implementations, device 210 can provide, to vehicle platform 220, all location data received by device 210. In some implementations, device 210 can provide, to vehicle platform 220, the added location data when device 210 detects an event associated with the vehicle, such as a change in vehicle heading (e.g., a ninety degree turn), a significant increase in a vehicle speed, a significant increase in the vehicle speed, and/or the like. In some implementations, device 210 can store all location data received by device 210, or the added location data, and can provide, to vehicle platform 220, the stored location data when device 210 is connected to a network (e.g., a wireless access network, a cellular network, and/or the like).

In some implementations, device 210 and/or vehicle platform 220 may be utilized when no vehicles are present, such as when a pedestrian is walking. In such implementations, device 210 and/or vehicle platform 220 may collect information about footpaths, and may utilize such information in a fleet environment to generate footpath map data to help drivers navigate on foot from parking locations to delivery locations, and/or the like.

In some implementations, device 210 may not include a user interface (e.g., as shown in the Figures), and device 210 may still perform the function described herein.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Some implementations described herein provide a device (e.g., provided in a vehicle) that dynamically reports location data for the vehicle based on a fitted history model. For example, the device can report more location data when the vehicle is traveling an unknown route, and can report less location data when the vehicle is traveling a known route. The device can receive, during a time period, location data associated with a location of vehicle, and can receive historical map data associated with the location. The device can process the location data, with a fitted history model, to generate a vehicle path, and can process a portion of the location data with the fitted history model, to generate a fitted history path. The device can compare the vehicle path and the fitted history path to determine whether the vehicle path and the fitted history path match. If the vehicle path and the fitted history path match, the device can report the portion of the location data. If the vehicle path and the fitted history path do not match, the device can add location data to the portion of the location data until the vehicle path and the fitted history path match, and can report the portion of the location data and the added location data.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors configured to:
receive historical map data associated with a location of a vehicle;
determine a first quantity of location data associated with the location of the vehicle;
process the first quantity of location data, with a fitted history model, to generate a vehicle path;
process a second quantity of location data, with the fitted history model, to generate a fitted history path, based on the historical map data,
the first quantity of location data including the second quantity of location data and including other location data not contained in the second quantity of location data;
compare the vehicle path and the fitted history path;
determine whether the vehicle path and the fitted history path match based on comparing the vehicle path and the fitted history path; and
selectively perform a first action or a second action based on whether the vehicle path and the fitted history path match,
wherein the first action is performed when the vehicle path and the fitted history path match,
wherein the second action is performed when the vehicle path and the fitted history path do not match,
wherein the first action includes providing, to a vehicle platform associated with the vehicle, the second quantity of location data, and not providing to the vehicle platform at least a portion of the other location data; and
wherein the second action includes actively adjusting an amount of data provided to the vehicle platform by adding location data to the second quantity of the location data and providing the second quantity of location data and the added location data to the vehicle platform.

2. The device of claim 1, wherein the second action includes adding additional location data to the second quantity of location data and regenerating the fitted history path, based on the added additional location data, until the vehicle path and the fitted history path match.

3. The device of claim 1, wherein:
the historical map data is associated with one or more locations to which the vehicle is to travel at one or more future times.

4. The device of claim 1, wherein the fitted history model generates the vehicle path based on one or more routing calculation techniques,
the one or more routing calculation techniques including one or more of:
a Dijkstra technique,
a Bellman-Ford technique,
a Floyd-Warshall technique, or
a Johnson's technique.

5. The device of claim 1, wherein the one or more processors, when determining whether the vehicle path and the fitted history path match, are to:
utilize one or more map matching techniques to determine whether the vehicle path and the fitted history path match,
the one or more map matching techniques including a Fréchet distance technique.

6. The device of claim 1,
wherein the vehicle platform updates the historical map data based on the second quantity of location data and the added location data.

7. The device of claim 1, wherein the second action includes updating the historical map data based on the second quantity of location data and the added location data.

8. A non-transitory computer-readable medium storing instructions, the instructions comprising:
one or more instructions that, when executed by one or more processors, cause the one or more processors to:
receive historical map data associated with a location of a vehicle;
determine location data associated with the location of the vehicle;
process the location data, with a fitted history model, to generate a vehicle path;
process a subset of the location data, with the fitted history model, to generate a fitted history path, based on the historical map data;
compare the vehicle path and the fitted history path;
determine whether the vehicle path and the fitted history path match based on comparing the vehicle path and the fitted history path; and
selectively perform a first action or a second action based on whether the vehicle path and the fitted history path match,
wherein the first action is performed when the vehicle path and the fitted history path match,
wherein the second action is performed when the vehicle path and the fitted history path do not match,
wherein the first action includes providing, to a vehicle platform associated with the vehicle, the subset of the location data, and
wherein the second action includes increasing an amount of data provided to the vehicle platform by adding location data to the subset of the location data and providing the subset of the location data and the added location data to the vehicle platform.

9. The non-transitory computer-readable medium of claim 8, wherein the second action includes adding additional location data to the subset of the location data and regenerating the fitted history path, based on the added additional location data, until the vehicle path and the fitted history path match.

10. The non-transitory computer-readable medium of claim 8, wherein:

the historical map data is based on similar or same routes traveled in the past.

11. The non-transitory computer-readable medium of claim 8, wherein the fitted history model generates the vehicle path based on one or more routing calculation techniques,
the one or more routing calculation techniques including one or more of:
a Dijkstra technique,
a Bellman-Ford technique,
a Floyd-Warshall technique,
a Johnson's technique, or
a Viterbi technique.

12. The non-transitory computer-readable medium of claim 8, wherein the one or more instructions that cause the one or more processors to determine whether the vehicle path and the fitted history path match, comprise:
one or more instructions that, when executed by the one or more processors, cause the one or more processors to:
generate the fitted history path to be close to a last known route traveled by the vehicle.

13. The non-transitory computer-readable medium of claim 8, wherein the second action includes providing the subset of the location data and the added location data to the vehicle platform associated with the vehicle,
wherein the vehicle platform updates the historical map data based on the subset of the location data and the added location data.

14. The non-transitory computer-readable medium of claim 8, wherein the second action includes updating the historical map data based on the subset of the location data and the added location data.

15. A method, comprising:
receiving, by a device, historical map data associated with a location of a vehicle;
determining, by the device, location data associated with the location of the vehicle;
processing, by the device, the location data, with a fitted history model, to generate a vehicle path;
processing, by the device, a portion of the location data, with the fitted history model, to generate a fitted history path, based on the historical map data;
comparing, by the device, the vehicle path and the fitted history path;
determining, by the device, whether the vehicle path and the fitted history path match based on comparing the vehicle path and the fitted history path; and
selectively performing, by the device, a first action or a second action based on whether the vehicle path and the fitted history path match,
wherein the first action is performed when the vehicle path and the fitted history path match,
wherein the second action is performed when the vehicle path and the fitted history path do not match,
wherein the first action includes providing, to a vehicle platform associated with the vehicle, the location data at a rate that is less than a rate at which the location data is determined by the device, and
wherein the second action includes actively increasing the rate at which location data is provided to the vehicle platform, by adding location data to the portion of the location data and providing the portion of the location data and the added location data to the vehicle platform.

16. The method of claim 15, wherein the second action includes adding location data to the portion of the location data and regenerating the fitted history path, based on the added location data, until the vehicle path and the fitted history path match.

17. The method of claim 15, wherein:
the location data includes a first quantity of data points, and
the portion of the location data and the added location data include a second quantity of data points that is less than the first quantity of data points.

18. The method of claim 15, wherein the fitted history model generates the vehicle path based on one or more routing calculation techniques,
the one or more routing calculation techniques including one or more of:
a Dijkstra technique,
a Bellman-Ford technique,
a Floyd-Warshall technique, or
a Johnson's technique.

19. The method of claim 15, wherein determining whether the vehicle path and the fitted history path match, comprises:
utilizing one or more map matching techniques to determine whether the vehicle path and the fitted history path match,
the one or more map matching techniques including a measure of similarity between curves that takes into account location and ordering of points along the curves.

20. The method of claim 15, wherein the second action includes updating the historical map data based on the portion of the location data and the added location data.

* * * * *